United States Patent
Ni et al.

(10) Patent No.: US 10,564,889 B2
(45) Date of Patent: Feb. 18, 2020

(54) METHOD AND APPARATUS FOR PROCESSING DATA BASED ON PHYSICAL HOST

(71) Applicant: BEIJING BAIDU NETCOM SCIENCE AND TECHNOLOGY CO., LTD., Beijing (CN)

(72) Inventors: Xun Ni, Beijing (CN); Rui Zhao, Beijing (CN)

(73) Assignee: BEIJNG BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1 day.

(21) Appl. No.: 16/133,961

(22) Filed: Sep. 18, 2018

(65) Prior Publication Data

US 2019/0155539 A1    May 23, 2019

(30) Foreign Application Priority Data

Nov. 23, 2017    (CN) .......................... 2017 1 1185326

(51) Int. Cl.
*G06F 3/06* (2006.01)
*G06F 9/455* (2018.01)
*G06F 12/02* (2006.01)

(52) U.S. Cl.
CPC .......... *G06F 3/0655* (2013.01); *G06F 3/0604* (2013.01); *G06F 3/0673* (2013.01); *G06F 9/45558* (2013.01); *G06F 12/02* (2013.01); G06F 2009/45583 (2013.01)

(58) Field of Classification Search
None
See application file for complete search history.

(56) References Cited

U.S. PATENT DOCUMENTS

| | | | | |
|---|---|---|---|---|
| 4,885,681 A | * | 12/1989 | Umeno | G06F 13/10 718/1 |
| 4,975,836 A | * | 12/1990 | Hirosawa | G06F 9/462 710/262 |
| 2005/0080970 A1 | * | 4/2005 | Jeyasingh | G06F 9/45533 710/266 |

\* cited by examiner

*Primary Examiner* — Kevin Verbrugge
(74) *Attorney, Agent, or Firm* — Lathrop Gage LLP (57) ABSTRACT

A method and apparatus for processing data based on a physical host are provided. A specific embodiment of the method includes: acquiring a read and write request sent by a virtual machine; sending the read and write request to a host machine for processing; starting masking a preset signal interrupting a current process, in response to the host machine completing processing the read and write request; and terminating masking the preset signal in response to completing following: updating a first array recording information of the processed read and write request, updating a second array recording information of completing the acquired read and write request, and informing the virtual machine of a processing result of the read and write request. The embodiment provides a signal masking mechanism, and guarantees data consistency, thereby improving the operating efficiency of a physical host.

11 Claims, 5 Drawing Sheets

METHOD AND APPARATUS FOR PROCESSING DATA BASED ON PHYSICAL HOST

CROSS-REFERENCE TO RELATED APPLICATIONS

This application claims priority to Chinese Patent Application no. 201711185326.6, filed with the China National Intellectual Property Administration (CNIPA) on Nov. 23, 2017, the contents of which are incorporated herein by reference in their entirety.

TECHNICAL FIELD

Embodiments of the disclosure relate to the field of computer technology, specifically to the field of virtualization technology, and more specifically to a method and apparatus for processing data based on a physical host.

BACKGROUND

As the computer technology develops, increasingly more services are provided using computer and Internet technology. A logical computer, i.e., a virtual machine, can be virtualized on a physical host (electronic device) using virtualization technology.

At present, there is no mask mechanism, when processing of a read and write request sent by a virtual machine, against a preset signal to interrupt the current process.

SUMMARY

Embodiments of the disclosure present a method and apparatus for processing data based on a physical host.

In a first aspect, an embodiment of the disclosure provides a method for processing data based on a physical host. The method includes: acquiring a read and write request sent by a virtual machine; sending the read and write request to a host machine for processing; starting masking a preset signal interrupting a current process, in response to the host machine completing processing the read and write request; and terminating masking the preset signal in response to completing following: updating a first array recording information of the processed read and write request, updating a second array recording information of completing the acquired read and write request, and informing the virtual machine of a processing result of the read and write request.

In some embodiments, the acquiring a read and write request sent by a virtual machine includes: storing physical address information of the read and write request into a third array; and storing an initial position of the read and write request in the third array into a fourth array.

In some embodiments, the sending the read and write request to a host machine for processing includes: determining a to-be-sent read and write request at a preset time interval based on a fifth array recording information of a to-be-processed read and write request sent to the host machine and the fourth array; and sending the to-be-sent read and write request to the host machine for processing, and updating the fifth array.

In some embodiments, the informing the virtual machine of a processing result of the read and write request includes: determining a to-be-informed processing result at a preset time interval based on a sixth array recording information of informing the virtual machine of the processing result of the read and write request and the first array; and informing the virtual machine of the to-be-informed processing result.

In some embodiments, the method further includes: determining an unprocessed read and write request in the acquired read and write request based on the second array, in response to detecting a predefined abnormal exit event occurring; and sending the unprocessed read and write request to the host machine for processing.

In a second aspect, an embodiment of the disclosure provides an apparatus for processing data based on a physical host. The apparatus includes: an acquisition unit, for acquiring a read and write request sent by a virtual machine; a first sending unit, for sending the read and write request to a host machine for processing; a starting unit, for starting masking a preset signal interrupting a current process, in response to the host machine completing processing the read and write request; and a terminating unit, for terminating masking the preset signal in response to completing following: updating a first array recording information of the processed read and write request, updating a second array recording information of completing the acquired read and write request, and informing the virtual machine of a processing result of the read and write request.

In some embodiments, the acquisition unit includes: a first storing subunit, for storing physical address information of the read and write request into a third array; and a second storing subunit, for storing an initial position of the read and write request in the third array into a fourth array.

In some embodiments, the first sending unit includes: a determining subunit, for determining a to-be-sent read and write request at a preset time interval based on a fifth array recording information of a to-be-processed read and write request sent to the host machine and the fourth array; and a sending subunit, for sending the to-be-sent read and write request to the host machine for processing, and updating the fifth array.

In some embodiments, the apparatus further includes an informing unit for informing the virtual machine of a processing result of the read and write request, and the informing unit is further configured for: determining a to-be-informed processing result at a preset time interval based on a sixth array recording information of informing the virtual machine of the processing result of the read and write request and the first array; and informing the virtual machine of the to-be-informed processing result.

In some embodiments, the apparatus further includes: a determining unit, for determining an unprocessed read and write request in the acquired read and write request based on the second array, in response to detecting a predefined abnormal exit event occurring; and a second sending unit, for sending the unprocessed read and write request to the host machine for processing.

In a third aspect, an embodiment of the disclosure provides a device, the device including: one or more processors; and a memory for storing one or more programs, where the one or more programs enable, when executed by the one or more processors, the one or more processors to implement the method according to the first aspect.

In a fourth aspect, an embodiment of the disclosure provides a computer readable storage medium storing a computer program therein, where the program implements, when executed by a processor, the method according to the first aspect.

The method and apparatus for processing data based on a physical host provided by embodiments of the disclosure acquire a read and write request sent by a virtual machine; send the read and write request to a host machine for processing; start masking a preset signal interrupting a current process, in response to the host machine completing processing the read and write request; and terminate masking the preset signal in response to completing following: updating a first array recording information of the processed read and write request, updating a second array recording information of completing the acquired read and write request, and informing the virtual machine of a processing result of the read and write request, thereby providing a signal masking mechanism, guaranteeing data consistency, and improving the operating efficiency of the physical host.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in some embodiments may be combined with each other on a non-conflict basis. The present application will be described below in detail with reference to the accompanying drawings and in combination with the embodiments.

Figure 1:
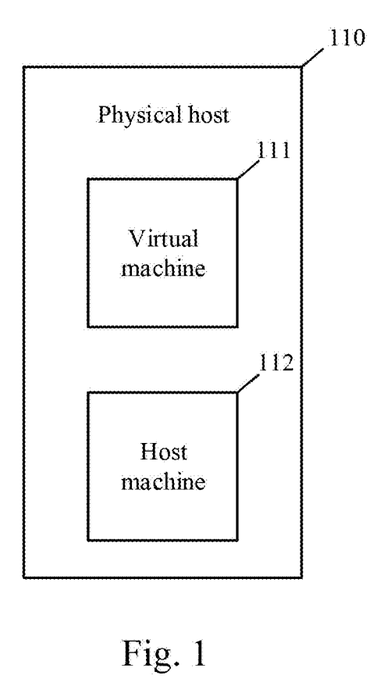
FIG. 1 is a schematic structural diagram of a physical host in which the disclosure may be applied.

FIG. 1 shows a schematic structural diagram of a physical host in which an embodiment of a method for processing data based on a physical host or an apparatus for processing data based on a physical host according to the disclosure may be applied.

As shown in FIG. 1, a physical host 110 may include a virtual machine 111 and a host machine 112. The physical host 110 may be a server, a terminal computer or the like, which is not limited in the disclosure. A variety of virtualization frameworks may be used for the physical host 110, such as a Xen virtualization framework, which is an open source virtual machine monitor, or a KVM (Kernel-based Virtual Machine) virtualization framework, which is not limited in the disclosure.

The physical host 110 includes a hardware system and a software system. The hardware system of the physical host 110 may include a central processing unit (CPU), a main memory, a hard disk, an input/output unit, and the like. The software system of the physical host 110 may include a program of the virtual machine 111, a program of the host machine 112, and an intermediate layer coordinating the virtual machine 111 and the host machine 112.

It should be noted that the method for processing data based on a physical host according to the embodiment of the disclosure may be executed by the intermediate layer of the physical host 110. Accordingly, the apparatus for processing data based on a physical host may be set in the intermediate layer of the physical host 110. The intermediate layer may acquire a read and write request sent by the virtual machine, send the read and write request to the host machine for processing, then start masking a preset signal interrupting a current process, in response to the host machine completing processing the read and write request, and finally terminate masking the preset signal in response to completing following: updating a first array recording information of the processed read and write request, updating a second array recording information of completing the acquired read and write request, and informing the virtual machine of a processing result of the read and write request.

It should be appreciated that the number of virtual machines in FIG. 1 is only illustrative. There may be any number of virtual machines based on implementation needs.

Figure 2:
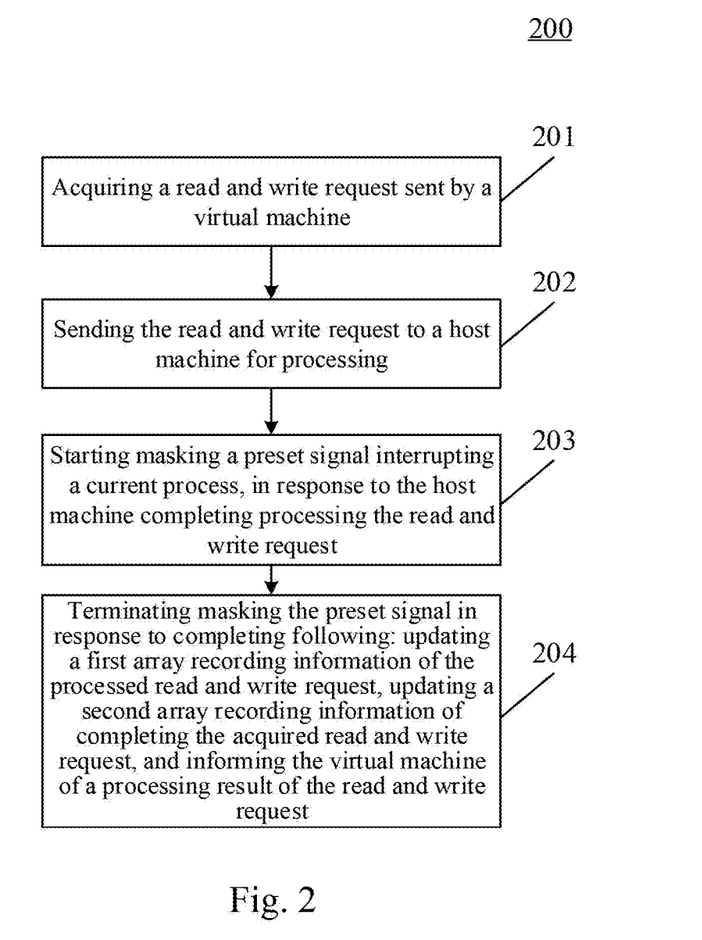
FIG. 2 is a process diagram of an embodiment of a method for processing data based on a physical host according to the disclosure.

Further referring to FIG. 2, a process 200 of an embodiment of a method for processing data based on a physical host according to the disclosure is shown. The method for processing data based on a physical host includes:

step 201: acquiring a read and write request sent by a virtual machine.

In some embodiments, the intermediate layer of an electronic device (e.g., a physical host shown in FIG. 1) on which the method for processing data based on a physical host runs may first acquire a read and write request sent by a virtual machine. The read and write request may be an I/O (input/output) request. The way to acquire a read and write request sent by the virtual machine may be determined based on a protocol for communication between the program of the virtual machine and the program of the host machine. The protocol includes virtio, vhost, and so on.

The virtio is abstraction of a set of universal analog devices in a semi-virtualization hypervisor. The hypervisor is allowed to output a set of universal analog devices, and make them available through a universal application programming interface. The hypervisor is an intermediate software layer running between a physical server and an operating system, allows a plurality of operating systems and applications to share a set of underlying physical hardware, and therefore can also be considered as a "meta" operating system in a virtual environment. The hypervisor, also known as a virtual machine monitor, can coordinate access to all physical devices and virtual machines on a server. The vhost optimizes the virtio, is provided with an additional module in its kernel, and allows a device simulation code to be directly called into a kernel subsystem, rather than to be called from a user space execution system.

As an example, when a virtio protocol is used, its I/O mechanism can be achieved by a virtqueue (a virtio queue). The intermediate layer may include a front-end program and a back-end program. The front-end program of the virtual machine can receive a read and write request, and insert the read and write request into the virtqueue. Therefore, the intermediate layer of the electronic device acquires the read and write request via the virtqueue. The virtqueue may include a plurality of queues, each of the queues may be implemented by a ring buffer, and the ring buffer may be an array having a sequence number indicating a next available element.

step 202: sending the read and write request to a host machine for processing.

In some embodiments, the intermediate layer of the electronic device may send the read and write request acquired in the step 201 to the host machine for processing. The read and write request to be sent to a host machine for processing may be determined by a polling or informing mechanism, and then sent to the host machine for processing according to the protocol for communication between the program of the virtual machine and the program of the host machine.

As an example, when the virtio protocol is used, a back-end program may receive the read and write request sent by the front-end program via the virtqueue, and then send the read and write request to corresponding hardware to complete processing. Specifically, the hypervisor may awake a qemu, and deliver the request to the qemu process for processing. The qemu is an analog processor that distributes source codes based on a GNU general public license (GPL). Usually one qemu process corresponds to one virtual machine, includes one or more qemu threads, and can provide services for one or more virtual disks. One qemu thread is responsible for processing the reading/writing instructions for access to one of the virtual disks.

step 203: starting masking a preset signal interrupting a current process, in response to the host machine completing processing the read and write request.

In some embodiments, the intermediate layer of the electronic device may start masking a preset signal interrupting a current process, in response to the host machine completing processing the read and write request sent in the step 202. The host machine completing processing the read and write request may mean that the qemu process completes a reading/writing instruction, but the intermediate layer has not yet updated a related record, or informed the virtual machine of the processing result of the read and write request.

In some embodiments, the signal is a message (event) that is generated by a process itself during running or sent from the outside, and is a software simulation of a hardware interrupt (a soft interrupt). The masking a preset signal may be neglecting, blocking or the like the preset signal, and aims to disable the preset signal. In a linux system, the preset signal may include SIGTERM and SIGINT. The SIGINT is a program interrupt signal for informing a foreground process group to interrupt a process, which is sent when a user enters an INTR character (usually Ctrl-C). The SIGTERM is a program terminating signal, and is usually used for requesting a program to automatically normally exit.

As an example, in a linux system, signal masking may be implemented by a sigprocmask function. The sigprocmask function is a function in signal.h, provides an action of masking and unmasking a signal. The signal.h is a signal processing part in a C standard function library, and defines how to process different signals when a program is executed. The signal is used for interprocess communication, reporting abnormal behaviors (e.g., division by zero), and some key combinations inputted by the user (e.g., a signal SIGINT is produced by simultaneously pressing Ctrl and C keys).

Step 204: terminating masking the preset signal in response to completing following: updating a first array recording information of the processed read and write request, updating a second array recording information of completing the acquired read and write request, and informing the virtual machine of a processing result of the read and write request.

In some embodiments, the intermediate layer of the electronic device may terminate masking the preset signal started in the step 203 in response to completing following: updating a first array recording information of the processed read and write request, updating a second array recording information of completing the acquired read and write request, and informing the virtual machine of a processing result of the read and write request.

In some embodiments, the information of the read and write request may be a sequence number of the read and write request or other information capable of identifying the read and write request. As an example, when the virtio protocol is used, a sequence number generated when storing information such as a physical address associated with the read and write request may be used as the information of the read and write request. A specific form of the first array may be determined based on actual needs. For example, the first array may be in the form of a ring buffer. The acquired read and write request may refer to the read and write request acquired to the back-end program. The second array may include information of the acquired read and write request, and a character characterizing its completion status. For example, "0" may be used for identifying completion, while "1" may be used for identifying incompletion. The first array and the second array can be saved in the hypervisor.

In some embodiments, the informing the virtual machine of a processing result of the read and write request can be achieved by sending an interrupt to the virtual machine, and parameters for sending the interrupt to the virtual machine may be set when the virtual machine is initialized. A to-be-informed processing result may be determined by a polling or informing mechanism, and then informed to the virtual machine. The to-be-informed processing result may be determined by a polling mechanism at a preset time interval based on a sixth array recording information of informing the virtual machine of the processing result of the read and write request and the first array.

In some optional implementations of the embodiment, the method further includes: determining an unprocessed read and write request in the acquired read and write request based on the second array, in response to detecting a predefined abnormal exit event occurring; and sending the unprocessed read and write request to the host machine for processing. In the implementation, the predefined abnormal exit event may include abnormal exit of a back-end program of the virtual machine. When the virtual machine is reconnected to the back-end program, the second array may be sent by the hypervisor to the host machine for processing.

Figure 3:
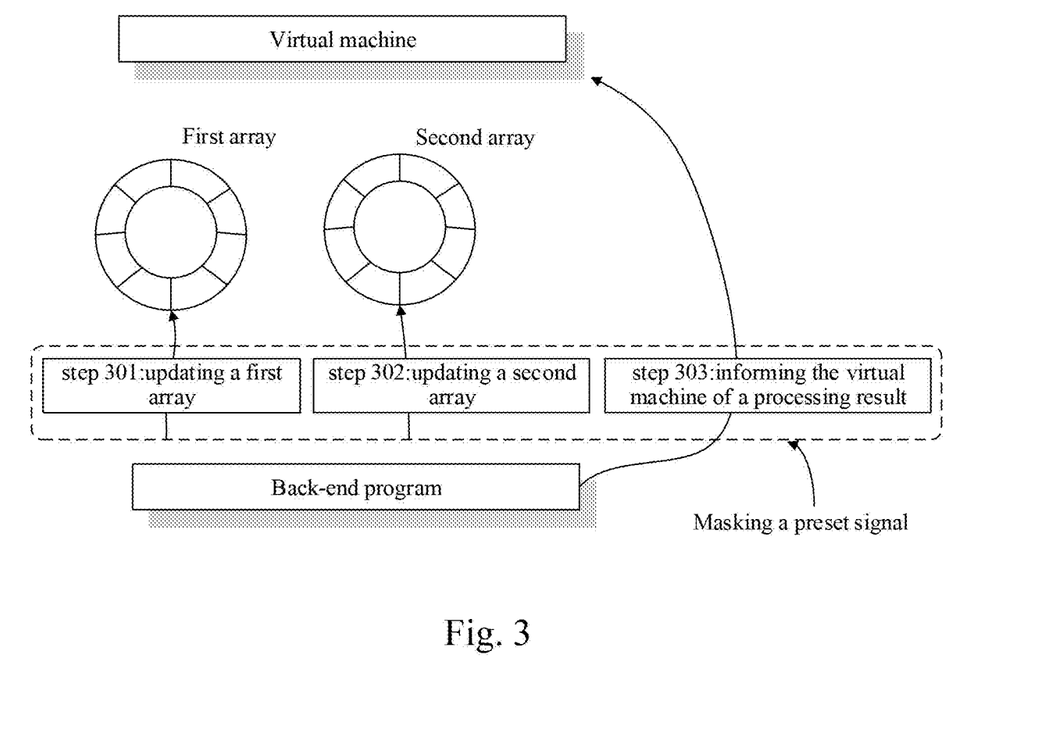
FIG. 3 is a schematic diagram of an application scenario of a method for processing data based on a physical host according to the disclosure.

Further referring to FIG. 3, a schematic diagram of an application scenario of a method for processing data based on a physical host according to the disclosure is shown. In the application scenario of FIG. 3, a back-end program of the intermediate layer masks a preset signal when executing step 301: updating a first array recording information of the processed read and write request; step 302: updating a second array recording information of completing the acquired read and write request; and step 303: informing the virtual machine of a processing result of the read and write request.

The method provided by the above embodiments of the disclosure first acquires a read and write request sent by a virtual machine, sends the read and write request to a host machine for processing, then starts masking a preset signal interrupting a current process, in response to the host machine completing processing the read and write request, and finally terminates masking the preset signal in response to completing following: updating a first array recording information of the processed read and write request, updating a second array recording information of completing the acquired read and write request, and informing the virtual machine of a processing result of the read and write request. Compared with a technical solution without signal masking, the method provided by the above embodiments of the disclosure avoids abnormal running of a virtual machine that is likely caused by data inconsistency when a back-end program abnormally exits, thereby improving the operating efficiency of the physical host.

Figure 4:
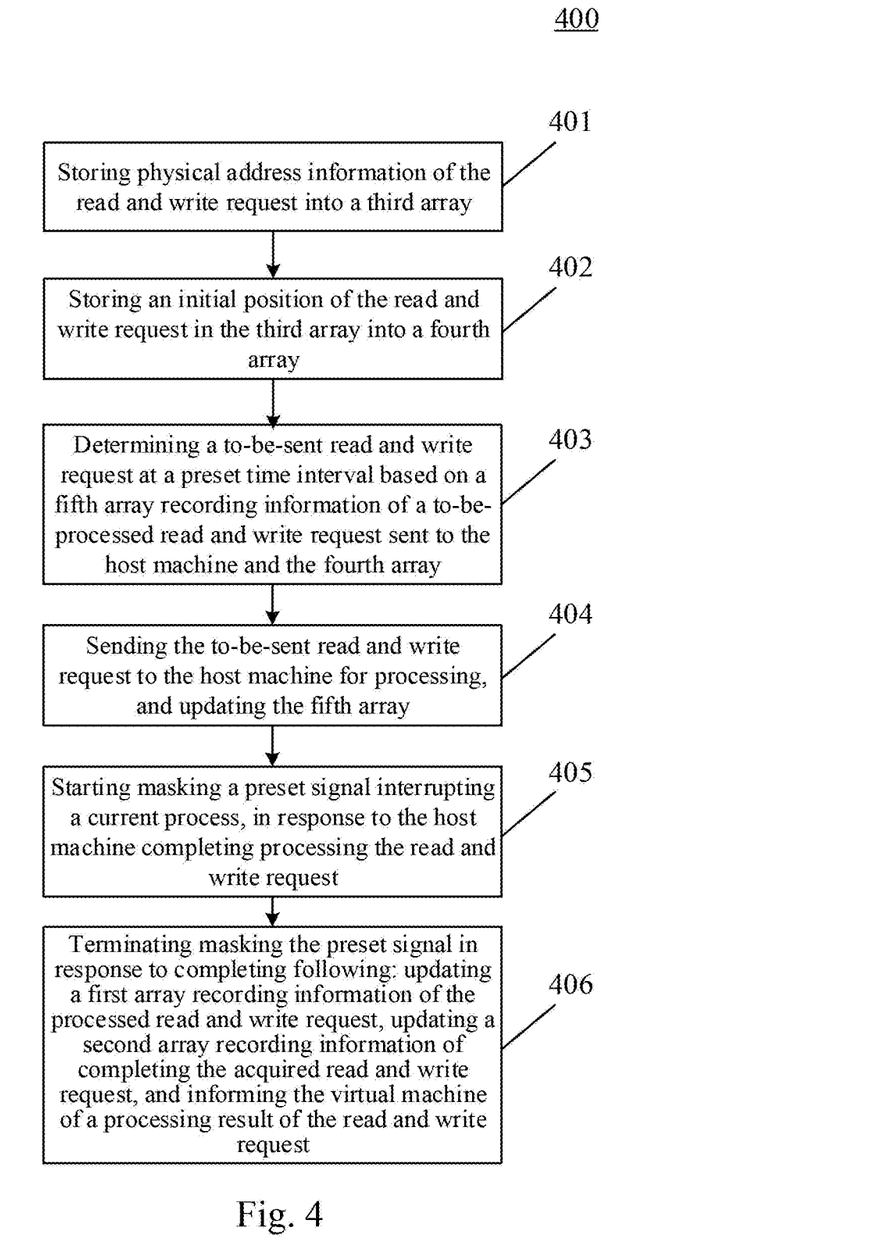
FIG. 4 is a process diagram of another embodiment of a method for processing data based on a physical host according to the disclosure.

Further referring to FIG. 4, a process 400 of another embodiment of a method for processing data based on a physical host according to the disclosure is shown. The process 400 of the method for processing data based on a physical host includes:

Step 401: storing physical address information of the read and write request into a third array.

In some embodiments, the intermediate layer of the electronic device (e.g., the physical host shown in FIG. 1) on which the method for processing data based on a physical host runs may first store physical address information of a read and write request into a third array. The physical address information may include an initial physical address, a length, an offset, and the like. As an example, when the virtio protocol is used, the third array may be an array of a virtqueue, and may be an array in the form of a ring buffer. A read and write request may need to occupy a plurality of elements, and the elements may be connected by a next domain to form a request chain.

Step 402: storing an initial position of the read and write request in the third array into a fourth array.

In some embodiments, the intermediate layer of the electronic device may store an initial position of the read and write request in the third array when stored in the step 401 into a fourth array. The initial position of the read and write request in the third array may be used as the information of the read and write request. When the read and write request is likely to occupy a plurality of elements, an initial position corresponding to a request chain in the third array is stored into the fourth array. The fourth array may also be an array in the form of a ring buffer.

Step 403: determining a to-be-sent read and write request at a preset time interval based on a fifth array recording information of a to-be-processed read and write request sent to the host machine and the fourth array.

In some embodiments, the intermediate layer of the electronic device may determine a to-be-sent read and write request at a preset time interval based on a fifth array recording information of a to-be-processed read and write request sent to the host machine and the fourth array in the step 402. A back-end program may send one or more to-be-processed read and write requests the host machine at a time. The back-end program can maintain the fifth array recording information of the to-be-processed read and write request sent to the host machine, and may determine which read and write requests in the fourth array are newly submitted by the virtual machine, and have not been sent to the host machine for processing by comparing the fourth array and the fifth array.

Step 404: sending the to-be-sent read and write request to the host machine for processing, and updating the fifth array.

In some embodiments, the intermediate layer of the electronic device may send the to-be-sent read and write request determined in the step 403 to the host machine for processing, and update the fifth array. The updating the fifth array may be adding information of the sent to-be-sent read and write request to the fifth array.

Step 405: starting masking a preset signal interrupting a current process, in response to the host machine completing processing the read and write request.

In some embodiments, the intermediate layer of the electronic device may start masking a preset signal interrupting a current process, in response to the host machine completing processing the read and write request.

Step 406: terminating masking the preset signal in response to completing following: updating a first array recording information of the processed read and write request, updating a second array recording information of completing the acquired read and write request, and informing the virtual machine of a processing result of the read and write request.

In some embodiments, the intermediate layer of the electronic device may terminate masking the preset signal started in the step 405 in response to completing following: updating a first array recording information of the processed read and write request, updating a second array recording information of completing the acquired read and write request, and informing the virtual machine of a processing result of the read and write request.

In some embodiments, operations in the step 405 and the step 406 are basically identical to those in the step 203 and the step 204, and are not repeated any more here.

As can be seen from FIG. 4, compared with the embodiment corresponding to FIG. 2, the process 400 of the method for processing data based on a physical host according to the embodiment further discloses acquiring a read and write request sent by a virtual machine by using an array, and sending the read and write request by using an array to a host machine for processing. Therefore, the solution according to the embodiment further improves the efficiency in information transmission between a virtual machine and a host machine.

Figure 5:
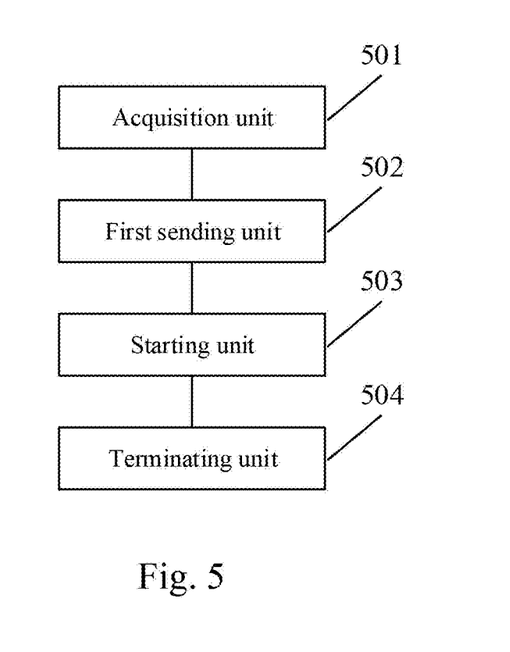
FIG. 5 is a structural schematic diagram of an embodiment of an apparatus for processing data based on a physical host according to the disclosure.

Further referring to FIG. 5, as implementations of the method shown in previous figures, the disclosure provides an embodiment of an apparatus for processing data based on a physical host. The embodiment of the apparatus corresponds to the embodiment of the method as shown in FIG. 2, and the apparatus may be specifically applied to a variety of electronic devices.

As shown in FIG. 5, an apparatus 500 for processing data based on a physical host according to the embodiment includes: an acquisition unit 501, a first sending unit 502, a starting unit 503, and a terminating unit 504. The acquisition unit 501 is configured for acquiring a read and write request sent by a virtual machine; the first sending unit 502 is configured for sending the read and write request to a host machine for processing; the starting unit 503 is configured for starting masking a preset signal interrupting a current process, in response to the host machine completing processing the read and write request; and the terminating unit 504 is configured for terminating masking the preset signal in response to completing following: updating a first array recording information of the processed read and write request, updating a second array recording information of completing the acquired read and write request, and informing the virtual machine of a processing result of the read and write request.

In some embodiments, specific processing of the acquisition unit 501, the first sending unit 502, the starting unit 503, and the terminating unit 504 of the apparatus 500 for processing data based on a physical host may correspond to the steps 201, 202, 203 and 204 in some embodiments corresponding to FIG. 2.

In some embodiments, the acquisition unit 501 includes: a first storing subunit (not shown in the figure), for storing physical address information of the read and write request into a third array; and a second storing subunit (not shown in the figure), for storing an initial position of the read and write request in the third array into a fourth array.

In some embodiments, the first sending unit 502 includes: a determining subunit (not shown in the figure), for determining a to-be-sent read and write request at a preset time interval based on a fifth array recording information of a to-be-processed read and write request sent to the host machine and the fourth array; and a sending subunit (not shown in the figure), for sending the to-be-sent read and write request to the host machine for processing, and updating the fifth array.

In some embodiments, the apparatus further includes an informing unit (not shown in the figure) for informing the virtual machine of a processing result of the read and write request, and the informing unit (not shown in the figure) is further configured for: determining a to-be-informed processing result at a preset time interval based on a sixth array recording information of informing the virtual machine of the processing result of the read and write request and the first array; and informing the virtual machine of the to-be-informed processing result.

In some embodiments, the apparatus further includes: a determination unit (not shown in the figure), for determining an unprocessed read and write request in the acquired read and write request based on the second array, in response to detecting a predefined abnormal exit event occurring; and a second sending unit (not shown in the figure), for sending the unprocessed read and write request to the host machine for processing.

The apparatus provided by embodiments of the disclosure acquires a read and write request sent by a virtual machine; sends the read and write request to a host machine for processing; starts masking a preset signal interrupting a current process, in response to the host machine completing processing the read and write request; and terminates masking the preset signal in response to completing following: updating a first array recording information of the processed read and write request, updating a second array recording information of completing the acquired read and write request, and informing the virtual machine of a processing result of the read and write request, thereby providing a signal masking mechanism, guaranteeing data consistency, and improving the operating efficiency of the physical host.

Figure 6:
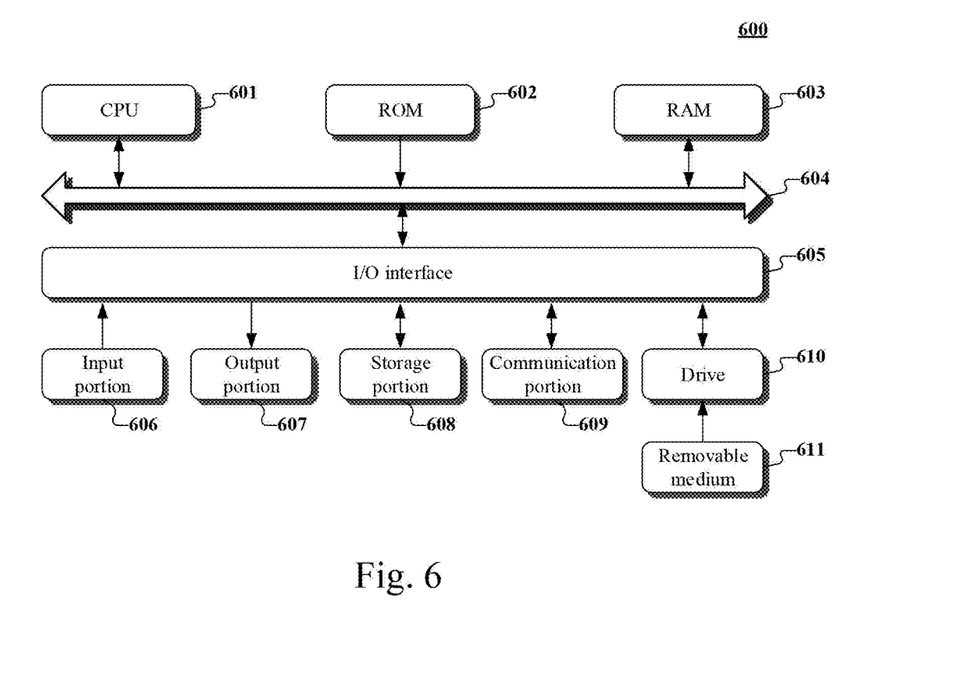
FIG. 6 is a structural schematic diagram of a computer system suitable for implementing a server according to an embodiment of the disclosure.

Referring to FIG. 6, a schematic structural diagram of a computer system 600 adapted to implement an electronic device the embodiments of the present disclosure is shown. The electronic device shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in some embodiments of the present application may be implemented by means of software or hardware. The described units or modules may also be provided in a processor, for example, described as: a processor, comprising an acquisition unit, a first sending unit, a starting unit, and a terminating unit, where the names of these units or modules do not in some cases constitute a limitation to such units or modules themselves. For example, the acquisition unit may also be described as "a unit for acquiring a read and write request sent by the virtual machine."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a read and write request sent by the virtual machine; send the read and write request to the host machine for processing; start masking a preset signal interrupting a current process, in response to the host machine completing processing the read and write request; and terminate masking the preset signal in response to completing following: updating a first array recording information of the processed read and write request, updating a second array recording information of completing the acquired read and write request, and informing the virtual machine of a processing result of the read and write request.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for processing data based on a physical host, the physical host comprising a host machine and at least one virtual machine, the method comprising:
   acquiring a read and write request sent by the virtual machine;
   sending the read and write request to the host machine for processing;
   starting masking a preset signal interrupting a current process, in response to the host machine completing processing the read and write request; and
   terminating masking the preset signal in response to completing following: updating a first array recording information of the processed read and write request, updating a second array recording information of completing the acquired read and write request, and informing the virtual machine of a processing result of the read and write request.

2. The method according to claim 1, wherein the acquiring a read and write request sent by the virtual machine comprises:
   storing physical address information of the read and write request into a third array; and
   storing an initial position of the read and write request in the third array into a fourth array.

3. The method according to claim 2, wherein the sending the read and write request to the host machine for processing comprises:
   determining a to-be-sent read and write request at a preset time interval based on a fifth array recording information of a to-be-processed read and write request sent to the host machine and the fourth array; and
   sending the to-be-sent read and write request to the host machine for processing, and updating the fifth array.

4. The method according to claim 1, wherein the informing the virtual machine of a processing result of the read and write request comprises:
   determining a to-be-informed processing result at a preset time interval based on a sixth array recording information of informing the virtual machine of the processing result of the read and write request and the first array; and
   informing the virtual machine of the to-be-informed processing result.

5. The method according to claim 1, further comprising:
   determining an unprocessed read and write request in the acquired read and write request based on the second array, in response to detecting a predefined abnormal exit event occurring; and
   sending the unprocessed read and write request to the host machine for processing.

6. An apparatus for processing data based on a physical host, the physical host comprising a host machine and at least one virtual machine, the apparatus comprising:
   at least one processor; and
   a memory storing instructions, the instructions when executed by the at least one processor, cause the at least one processor to perform operations, the operations comprising:
   acquiring a read and write request sent by the virtual machine;

sending the read and write request to the host machine for processing;

starting masking a preset signal interrupting a current process, in response to the host machine completing processing the read and write request; and terminating masking the preset signal in response to completing following: updating a first array recording information of the processed read and write request, updating a second array recording information of completing the acquired read and write request, and informing the virtual machine of a processing result of the read and write request.

7. The apparatus according to claim 6, wherein the acquiring a read and write request sent by the virtual machine comprises:

storing physical address information of the read and write request into a third array; and storing an initial position of the read and write request in the third array into a fourth array.

8. The apparatus according to claim 7, wherein the sending the read and write request to the host machine for processing comprises:

determining a to-be-sent read and write request at a preset time interval based on a fifth array recording information of a to-be-processed read and write request sent to the host machine and the fourth array; and sending the to-be-sent read and write request to the host machine for processing, and updating the fifth array.

9. The apparatus according to claim 6, wherein the informing the virtual machine of a processing result of the read and write request comprises:

determining a to-be-informed processing result at a preset time interval based on a sixth array recording information of informing the virtual machine of the processing result of the read and write request and the first array; and informing the virtual machine of the to-be-informed processing result.

10. The apparatus according to claim 6, where in the operations further comprise:

determining an unprocessed read and write request in the acquired read and write request based on the second array, in response to detecting a predefined abnormal exit event occurring; and sending the unprocessed read and write request to the host machine for processing.

11. A non-transitory computer-readable storage medium storing a computer program, the computer program when executed by one or more processors, causes the one or more processors to perform operations, the operations comprising:

acquiring a read and write request sent by the virtual machine;

sending the read and write request to the host machine for processing;

starting masking a preset signal interrupting a current process, in response to the host machine completing processing the read and write request; and terminating masking the preset signal in response to completing following: updating a first array recording information of the processed read and write request, updating a second array recording information of completing the acquired read and write request, and informing the virtual machine of a processing result of the read and write request.

* * * * *